(12) United States Patent
Buellesfeld et al.

(10) Patent No.: US 10,384,973 B2
(45) Date of Patent: Aug. 20, 2019

(54) METHOD FOR REDRAWING OF GLASS

(71) Applicant: SCHOTT AG, Mainz (DE)

(72) Inventors: Frank Buellesfeld, Kriftel (DE); Ralf Biertuempfel, Mainz-Kastel (DE)

(73) Assignee: SCHOTT AG, Mainz (DE)

(*) Notice: Subject to any disclaimer, the term of this patent is extended or adjusted under 35 U.S.C. 154(b) by 535 days.

(21) Appl. No.: 14/294,967

(22) Filed: Jun. 3, 2014

(65) Prior Publication Data
US 2014/0357467 A1 Dec. 4, 2014

(30) Foreign Application Priority Data
Jun. 4, 2013 (DE) .................. 10 2013 105 734

(51) Int. Cl.
*C03B 23/037* (2006.01)
*C03B 29/04* (2006.01)

(52) U.S. Cl.
CPC ............ *C03B 23/037* (2013.01); *C03B 29/04* (2013.01)

(58) Field of Classification Search
CPC ............................ C03B 23/037; C03B 29/04
See application file for complete search history.

(56) References Cited

U.S. PATENT DOCUMENTS

| 3,107,196 A | 10/1963 | Acloque |
| 3,635,687 A | 1/1972 | Dunlap et al. |
| 4,354,866 A * | 10/1982 | Mouly ............... C03B 18/04 65/182.3 |
| 4,869,315 A | 9/1989 | Mevenkamp |
| 5,248,483 A | 9/1993 | Carter |
| 6,715,317 B1 | 4/2004 | Bräuer et al. |
| 6,938,442 B1 | 9/2005 | Schmitt et al. |
| 7,231,786 B2 | 6/2007 | Cimo et al. |
| 7,306,684 B2 | 12/2007 | Takayama et al. |
| 2005/0031831 A1 | 2/2005 | Bullesfeld et al. |
| 2006/0059950 A1 | 3/2006 | Buellesfeld et al. |
| 2006/0112728 A1 | 6/2006 | Nakagawa |
| 2007/0178281 A1 | 8/2007 | Nakamura et al. |
| 2007/0271957 A1 | 11/2007 | Nakamura et al. |
| 2008/0216515 A1 | 9/2008 | Kumada |
| 2009/0314032 A1 | 12/2009 | Tomamoto et al. |

(Continued)

FOREIGN PATENT DOCUMENTS

| CN | 1230394 | 12/2005 |
| CN | 101031516 | 9/2007 |

(Continued)

OTHER PUBLICATIONS

"Glass-Viscosity and Viscometric Fixed Points, Part 2: Determination of viscosity by rotation viscometers, (ISO 7884-2 : 1987)" DIN Deutsches Institut fur Normung e. V., Berlin, DIN ISO 7884-2, Feb. 1998, with English Translation, 25 pages.

(Continued)

*Primary Examiner* — Queenie S Dehghan
(74) *Attorney, Agent, or Firm* — Ohlandt, Greeley, Ruggiero & Perle, L.L.P.

(57) ABSTRACT

A drawing method for glass is described. The method provides glass components that have a strongly increased ratio of width to thickness when compared to the preform, which makes the manufacturing of flat glass components more economical. The method purposefully controls the temperature distribution within the preform.

14 Claims, 4 Drawing Sheets

(56) References Cited

U.S. PATENT DOCUMENTS

| | | |
|---|---|---|
| 2010/0192634 A1 | 8/2010 | Higuchi et al. |
| 2012/0048905 A1 | 3/2012 | Kudva |
| 2014/0342120 A1 | 11/2014 | Buellesfeld |
| 2015/0274573 A1 | 10/2015 | Buellesfeld |

FOREIGN PATENT DOCUMENTS

| | | |
|---|---|---|
| CN | 101090874 | 12/2007 |
| CN | 102432158 | 5/2012 |
| EP | 0 819 655 A2 | 1/1998 |
| GB | 827488 A | 2/1960 |
| JP | H05116974 | 5/1993 |
| JP | 2006151736 | 6/2006 |
| JP | 2011093739 | 5/2011 |
| KR | 10-0906017 | 7/2009 |
| TW | I312769 B | 8/2009 |
| TW | 201228951 | 7/2012 |
| WO | 2013070672 A1 | 5/2013 |

OTHER PUBLICATIONS

"Glass-Viscosity and Viscometric Fixed Points, Part 3: Determination of viscosity by fibre elongation viscometer, (ISO 7884-3 : 1987)" DIN Deutsches Institut fur Normung e. V., Berlin, DIN ISO 7884-3, Feb. 1998, with English Translation, 22 pages.

"Glass-Viscosity and Viscometric Fixed Points, Part 4: Determination of viscosity by beam bending (ISO 7884-4 : 1987)" DIN Deutsches Institut fur Normung e. V., Berlin, DIN ISO 7884-4, Feb. 1998, with English Translation, 27 pages.

"Glass-Viscosity and Viscometric Fixed Points, Part 5: Determination of working point by sinking bar viscometer (ISO 7884-5 : 1987)" DIN Deutsches Institut fur Normung e. V., Berlin, DIN ISO 7884-5, Feb. 1998, with English Translation, 25 pages.

Yamane et al, Handbook of Glass Engineering, Mar. 30, 2007, 4th issue, p. 174-181, Asakura Shoten. (Abstract in English attached).

\* cited by examiner

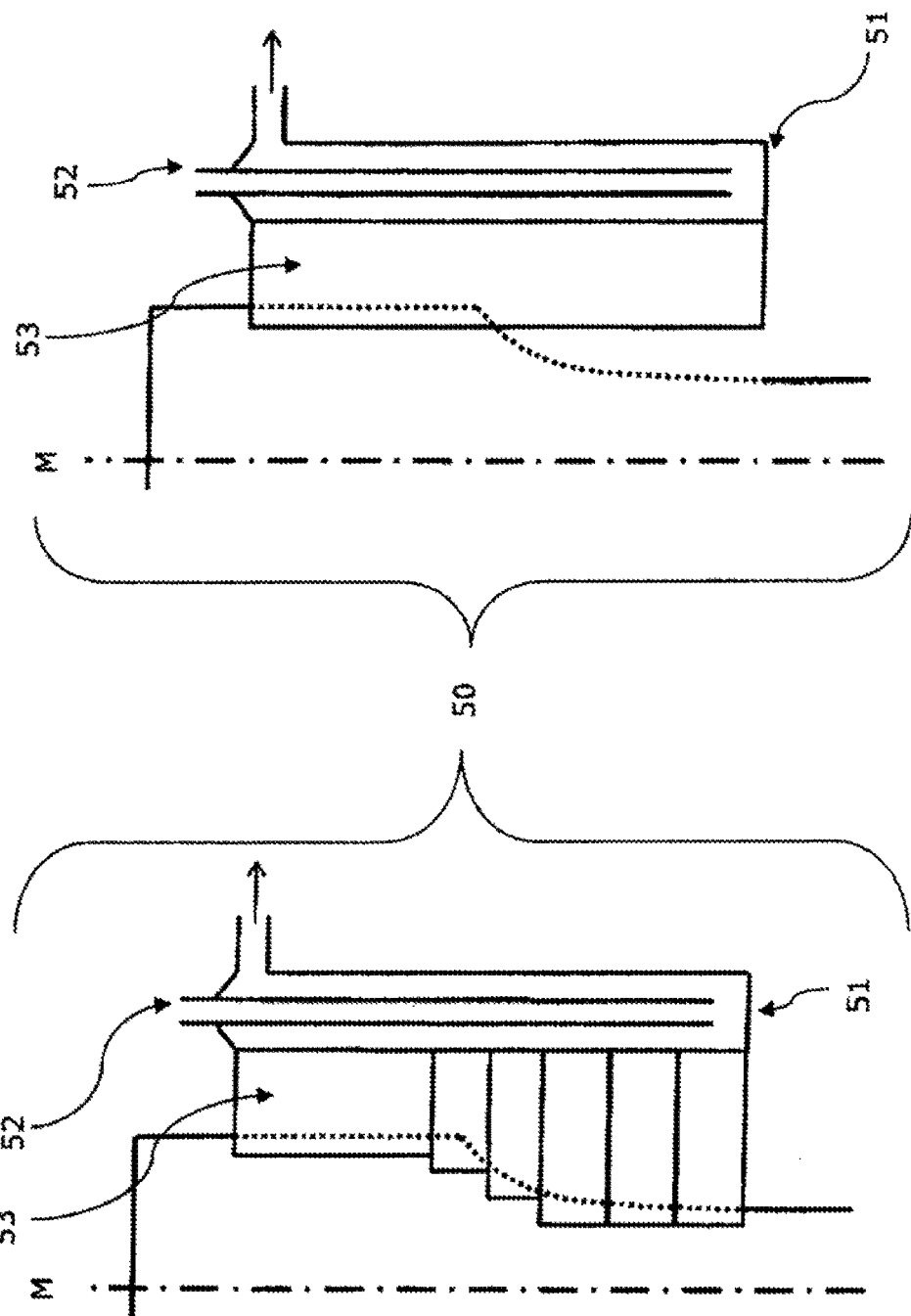

METHOD FOR REDRAWING OF GLASS

CROSS REFERENCE TO RELATED APPLICATIONS

This application claims benefit under 35 U.S.C. § 119(a) of German Patent Application No. 10 2013 105 734.9, filed Jun. 4, 2013, the entire contents of which are incorporated herein by reference.

BACKGROUND OF THE INVENTION

1. Field of the Invention

The present invention relates to a method for redrawing of glass, an apparatus for conducting of said method and a glass component which can be prepared by said method.

2. Description of Related Art

In principle, the redrawing of glasses is known, in particular a comprehensive state of the art about the redrawing of blanks and/or blanks with circular cross-section for the drawing of glass fibers exists.

During a redrawing method a glass piece is partially heated and drawn in the longitudinal direction with the help of suitable mechanical equipment. When the glass piece—the blank—is fed into a heating zone at a constant speed and when the heated glass is drawn with a constant speed, then this results in a reduction of the cross-section shape of the blank which depends on the ratio of the speeds. So, when e.g. tubular blanks are used, then again tubular products are prepared, but with smaller diameter. The cross-section shape of the products is similar to that of the blank, wherein for the most part it is even desirable to achieve a reproduction of the blank in a reduced scale of 1:1 by suitable measures (see EP 0 819 655 B1).

In a step of redrawing glasses normally an oblong blank is fixed on one end in a holder and heated at the other end in for example a muffle kiln. Once the glass has become deformable, it is drawn by the exertion of drawing force at the end of the blank being fixed in the holder. When during that the blank is moved forward into the muffle, then with a suitable selection of the temperatures this results in a product with a smaller cross-section, but a similar geometry. For example, a blank with circular cross-section is drawn into a glass fiber. The selection of the speeds of drawing the product, for example a component, and optionally moving forward the blank determines the reduction factor of the cross-section. Normally, the ratio of thickness to width of the cross-section of the blank remains constant. In the case of drawing glass fibers this is desired, because starting from a blank with circular cross-section a glass fiber having also a circular cross-section can be drawn.

It has been proved that it is difficult to redraw flat components, i.e. components having a ratio of width to thickness of the cross-section of for example 80:1. Only with blanks having a very high width it is possible to draw components having also a high width. So e.g. from a blank having a cross-section of 70 mm (millimeter) width and 10 mm thickness (B/D=7) a component having a cross-section of 7 mm width and 1 mm thickness (b/d=7) can be produced.

A component having a cross-section with a higher width and the same thickness is only possible, when a blank having a cross-section with a higher width or a lower thickness is used. The use of a blank having a higher width often fails due to the impossible producibility, and the use of a blank having a lower thickness is increasingly inefficient, since the blank during redrawing has to be exchanged more often.

In U.S. Pat. No. 7,231,786 B2 is described, how plane glass panes can be produced by redrawing. For achieving a product with higher width, in this case grippers are used which draw the soft glass into the width direction, prior to expanding the glass into the longitudinal direction with the help of edge rollers.

In U.S. Pat. No. 3,635,687 A a redrawing method is described, in which by cooling of the edge region of the flat blank a change of the ratio of width to thickness (B/D) is achieved. But with this method a maximum increase of the ratio of width to thickness by a factor of 10.7 can be achieved. The edge cooler used there is arranged such that only a small part of the edge regions in the deformation zone of the blank is cooled. So the temperature difference between the center region of the blank and the edge regions decreases very quickly again.

In EP 0 819 655 B1 a method for forming glass is described. In this case in a forming step also redrawing can be used. But it is not described, how the ratio of width to thickness (B/D) is adjusted. Here after heating the glass is locally heated or cooled for manipulating the geometry.

Each of these manipulations described in these references only results in a smaller change of the geometry of the blank in comparison to the final shape and/or to the shape of the drawn component. Furthermore, these methods are associated with relatively high effort. In particular in the case, when grippers or rolls should be used, a sophisticated redrawing apparatus is required which is susceptible to defects.

Thus, the object of the present invention is the provision of an efficient method for the production of glass components. Furthermore, a method should be provided which makes it possible to increase the ratio of width to thickness of the blank (B/D) in comparison to the ratio of width to thickness of the glass component produced (b/d). In particular, a method for the production of flat glass components should be provided, through which from a blank having a width B and a thickness D a flat glass component having a width b and a thickness d can be prepared, wherein the ratio b/d is much higher than the ratio B/D.

SUMMARY

The object according to the present invention is solved by the embodiments which are described herein.

The method for redrawing of glass according to the present invention comprises the following steps: providing of a blank of a glass having an average thickness D and an average width B, heating of said blank, and drawing of said blank to an average thickness d and an average width b, wherein the blank comprises a center region and two edge regions and the temperature of the blank in a deformation zone is adjusted such that the center region reaches a temperature T, which is higher than the temperature T2 of the edge regions, and wherein the deformation zone is the part of the blank which has a thickness of 1.05*d to 0.95*D. In this case the part of the deformation zone in which the mentioned temperature conditions are adjusted extends over a height of at least 75%, preferably at least 90% and particularly preferably at least 95% or 100% of the height of the deformation zone.

It has surprisingly been found that during the drawing step of the blank the geometry of the glass component can remarkably be changed, when the temperature of the edge regions of the blank in the deformation zone is kept lower than the temperature of the center region of the blank. Thus, the difference of the method according to the present invention compared to state of the art methods is that the part of the blank, the edge regions of which are kept at a temperature which is lower than that of the center region, is larger. In U.S. Pat. No. 3,635,687, for example, a method is conducted in which a cooling facility only cools an upper region of the deformation zone. So the respective temperatures of the center region and the edge regions will become equal very quickly again and only a lower extent of the increase of the ratio of width to thickness will be achieved.

The adjustment of the temperature conditions may for example be achieved via selective heating and/or selective cooling. A person skilled in the art will know numerous possibilities for selective heating and cooling in redrawing methods.

During the method according to the present invention the temperature of the edge regions within the whole deformation zone is preferably maintained at temperature $T_2$. Temperature $T_2$ is preferably adjusted by the measure that at least one of the edge regions of the blank in the deformation zone is cooled by at least one cooling facility. By cooling the edge regions with one or more cooling facilities the temperature conditions can be adjusted more selectively than in the case of selective heating.

Preferably, the horizontal distance between the cooling facility and the center of the blank becomes smaller with decreasing width of the blank—thus top down—so that the edge regions are shadowed with respect to the heating facility. The cooling facility or the cooling facilities thus follow the edge regions into the direction of the center of the blank, because the width of the blank decreases during the redrawing process, so that the edge regions approach the center of the blank. The horizontal distance between the center of the blank and at least one cooling facility is preferably lower than the half of the width of the blank at this site.

Thus, with the help of the cooling facility the temperature of the edge regions in the deformation zone can be adjusted to a temperature $T_2$, while the center region of the blank has a temperature $T_1$. The cooling facility is preferably designed such that it shields at least one edge region from the influence of a source of heat and/or actively cools at least one edge region.

Temperature T1 is preferably a temperature at which the glass of the blank has a viscosity $\eta_1$ of $10^5$ dPas to $10^9$ dPas, preferably $10^7$ dPas to $10^{8.5}$ dPas. Temperature $T^2$ is a temperature at which the glass of the blank has preferably such a viscosity $\eta_2$ that the quotient $\eta_2/\eta_1$ is 1.01 to $10^8$, preferably 10 to $10^5$. Due to the lower temperature in the edge regions the viscosity there is higher. By the measure that this higher viscosity is adjusted in a large part of the deformation zone, the reduction of the width of the glass component in comparison to the blank is strongly limited. Furthermore, tensions in the glass are reduced.

The deformation zone is the part of the blank in which the blank has a thickness of between 0.95*D and 1.05*d. Thus, it is a region within the blank in which the glass is deforming. The thickness is lower than the original thickness D, but the final thickness d is still not reached. According to the present invention, the deformation zone is preferably very small. The deformation zone (=meniscus) may preferably have a height of at most 6*D (in particular at most 100 mm), preferably at most 5*D (in particular at most 40 mm) and particularly preferably at most 4*D (in particular at most 30 mm). Preferably, the deformation zone extends over the whole width of the blank. "Height" of the deformation zone means the extent thereof in the direction into which the blank is drawn, thus normally the extent of the deformation zone in vertical direction.

These both measures, edge regions with lower temperature and a small deformation zone, together may be used for achieving an even higher width and/or a better thickness distribution.

Each of the edge regions of the blank has a width $B_R$ which is preferably characterized by $B_R$=D to (1.2*D). Preferably, respectively at most 30% of the width of the blank represent an edge region, so that up to 60% of the width of the blank represent edge regions. Further preferably, only at most 25% each of the width of the blank represent an edge region and particularly preferably at most 20% each. Each edge region has preferably a width $B_R$ of at least 1%, particularly preferably 5% of the width of the blank.

Preferably, the thickness of the blank is substantially constant in the center region as well as also in the edge regions. This means, that the thickness of the edge region may be higher than the thickness of the center region. But the thickness within each individual region is nearly constant.

The blank has an upper end and a lower end. The deformation zone is located between the upper and lower ends. Beyond the deformation zone the temperature of the blank is preferably lower than $T_1$. Because of that the deformation of the blank substantially only occurs in the region of the deformation zone. Above and below this region preferably the thickness and also the width of the blank substantially remain constant. For the sake of convenience throughout this description the term "blank" is used, when the glass is processed in this method, only after the end of the final process step according to the present invention the product is called "glass component".

Preferably, the increase of the ratio of width to thickness of the blank is substantially achieved by the measure that the thickness d of the glass component produced is substantially lower than the thickness D of the blank. Preferably, the thickness d is at most D/10, further preferably at most D/30 and particularly preferably at most D/75. Then, the glass component has preferably a thickness d of lower than 10 mm, further preferably lower than 1 mm, more preferably lower than 100 µm, further preferably lower than 50 µm and particularly preferably lower than 30 µm. With the present invention it is possible, to produce such thin glass components in high quality and with relatively large surface area.

Preferably, width b of the glass component produced in relation to width B of the blank is hardly decreased. This means that the ratio B/b is preferably at most 2, further preferably at most 1.6 and particularly preferably at most 1.25.

The method can be conducted in a redrawing apparatus which is also according to the present invention. For the purpose of heating the blank can be inserted into the redrawing apparatus. Preferably, the redrawing apparatus comprises a holder in which one end of the blank can be fixed. The holder is preferably located in an upper section of the redrawing apparatus. Then, the blank is fixed in the holder at its upper end.

The redrawing apparatus comprises at least one source of heat. The source of heat is preferably arranged in a center region of the redrawing apparatus. The source of heat may preferably be an electric resistance heater, a burner arrangement, a radiation heater, a laser with or without laser scanner or a combination thereof. The source of heat is preferably designed such that it can heat the blank being inserted into a deformation region in such a manner that the temperature distribution according to the present invention is achieved.

The deformation region is a region which is preferably located inside the redrawing apparatus. The source of heat increases the temperature of the deformation region and/or a part of the blank to a temperature which is so high that a blank which is disposed in the deformation region is heated within its deformation zone to a temperature which allows deformation. When a source of heat is used which is suitable for targeted heating of only a part of the blank, such as a laser, then the temperature in the deformation region is hardly increased. According to the manner of heating and the dimensions of the blank the length of the deformation region may vary.

The source of heat heats the deformation region and/or a part of the blank which is preferably so small that within the blank only the deformation zone being designed according to the present invention is heated. The parts of the blank which are above and below the deformation zone have preferably a lower temperature. According to the present invention, this is preferably achieved by the measure that the redrawing apparatus comprises one or more heat shields which shadow those parts of the blank being beyond the deformation region. The heat shields may be designed such that they also shadow the edge regions in such a manner that the temperature distribution being desired according to the present invention is achieved.

Alternatively or in addition, a source of heat allowing a focused heating of the blank in the deformation region and/or in the center region, such as for example a laser or a laser scanner, can be used. A further alternative embodiment relates to a source of heat, the dimensions of which are so small and which is disposed so near to the deformation zone that substantially the heat does not spread into regions beyond the deformation region and/or the center region.

The source of heat may be a radiation heater, wherein the heating effect of which is focused and/or limited to the deformation region and/or the center region by suitable radiation guiding and/or restricting means. For example, a KIR (short-wave IR) heater may be used, wherein by shadowing a deformation region with a preferable temperature distribution according to the present invention is created. Also cooled (with gas, water or air) heat shields may be used. A further source of heat which may be used is a laser. In this case for the radiation guidance of the laser a laser scanner may be used.

One or more cooling facilities may be arranged in the deformation region in such a manner that the temperature distribution being desired according to the present invention is adjusted. The cooling facility is preferably a cooling finger.

The apparatus may comprise a cooling zone being preferably arranged in a lower region of the redrawing facility, in particular directly below the deformation region. With this, directly after the deforming step, the viscosity of the glass is preferably changed to values of $>10^9$ dPas so that no appreciable deformation takes place any longer. This cooling is preferably conducted such that it results in a viscosity change of at least $10^6$ dPas/s. Depending on the glass of the blank this corresponds for example to temperatures $T_K$ in a range of 400 to 1000° C.

The method according to the present invention preferably comprises the further step of: cooling the blank after leaving the deformation region.

The further cooling of the blank to viscosities of $>10^9$ dPas may be achieved by cooling at ambient temperature (e.g. 10 to 25° C.). But the blank may also be cooled in an active manner in a fluid, such as for example in a gas stream. It is particularly preferable, when the product is cooled so slowly in a cooling zone which follows the deformation region that the residual tensions at least allow subsequent cross-cutting as well as the removal of sheet edges without any introversive cracks.

Preferably, the deformation region is arranged such and/or the source of heat and/or the cooling facilities are designed such that the deformation zone is created within the blank, as is desirable according to the present invention. By heating of the blank the viscosity of the glass at the respective site decreases so much that the blank can be drawn. This means that the blank becomes longer.

In this description the blank is drawn in vertical direction, but the basic idea of this invention can also be realized in installations in which the blank is drawn in horizontal direction or in each other conceivable drawing direction.

With the drawing step the thickness D of the blank becomes lower. Since the blank is preferably fixed with an upper end in a holder which is preferably located in an upper region of the redrawing facility, the drawing of the blank may be effected by impact of gravitation. But in preferable embodiments the redrawing facility comprises a drawing facility which preferably exerts drawing forces at a part of the blank below the deformation region, in particular at the lower end of the blank.

The drawing facility is preferably arranged in a lower region of the redrawing facility. In this case the drawing facility may be designed such that it comprises rolls acting on opposing sides of the blank. The blank may detachably be mounted with a lower end at a second holder. In particular, the second holder is a component of the drawing facility. At the second holder for example a weight may be mounted, which then draws the blank into the longitudinal direction.

In a preferable embodiment the blank is moved forward into the direction of the deformation zone so that the method can be conducted in a continuous manner. For this purpose the redrawing apparatus preferably comprises a feeding facility (normally in the upper region of the redrawing facility) which is suitable for moving the blank into the deformation region. So the redrawing apparatus can be used in continuous operation. The feeding facility preferably moves the blank into the deformation region with a speed $V_N$ which is lower than the speed $V_z$ with which the blank is drawn. So the blank is drawn into the longitudinal direction. The ratio of $V_N$ to $V_z$ is in particular <1, preferably at most 0.8, further preferably at most 0.4 and particularly preferably at most 0.1. The difference of these two speeds influences the extent of the reduction of the width and the thickness of the blank.

Prior to heating the blank is preferably preheated. For this purpose the redrawing apparatus preferably comprises a preheating zone in which the blank may be heated to a temperature $T_w$. The preheating zone is preferably arranged in an upper region of the redrawing apparatus, thus outside the deformation region. Temperature $T_w$ corresponds approximately to a viscosity $\eta_w$ of $10^{10}$ to $10^{14}$ dPas. Thus, the blank is preferably preheated, before it enters the deformation region. So a faster movement through the deformation region becomes possible, since the time which is necessary for achieving temperature $T_1$ is shorter. With the preheating zone it can also be avoided that glasses with high thermal expansion coefficients break due to temperature gradients which are too high.

The viscosity of a glass depends on the temperature. At each temperature the glass has a certain viscosity. The temperature $T_1$ and/or $T_2$ which is necessary for achieving the desired viscosity $\eta_1$ and/or $\eta_2$ in the deformation zone depends on the glass. The viscosity of a glass will be determined according to DIN ISO 7884-2, -3, -4, -5.

The blank preferably consists of a glass which is selected from fluorophosphate glasses, phosphate glasses, soda-lime glasses, lead glasses, silicate glasses, aluminosilicate glasses and borosilicate glasses. The glass used may be a technical glass, in particular technical flat glass, or an optical glass.

Preferred technical glasses are soda-lime glasses and borosilicate glasses. In preferable embodiments the glasses are display glasses or thin glasses for barrier layers in plastic laminates.

Preferred optical glasses are phosphate glasses and fluorophosphate glasses. Phosphate glasses are optical glasses containing $P_2O_5$ as glass former. Then, $P_2O_5$ is the main component of the glass (i.e. no other component with a higher mass fraction is present in the glass). When a part of the phosphate in a phosphate glass is replaced by fluorine, then fluorophosphate glasses are obtained. For the synthesis of fluorophosphate glasses instead of oxidic compounds such as for example $Na_2O$ the respective fluorides such as NaF are added to the glass mixture.

According to the present invention preferably a flat blank is used, wherein according to the present invention a "flat blank" means that the width B of the blank is higher than the thickness D thereof. Preferably, the ratio of width to thickness of the blank (B/D) is at least 5, more preferably at least 7.

Preferably, the blank has a thickness D of at least 0.05 mm, more preferably at least 1 mm. The thickness is preferably at most 40 mm, more preferably at most 30 mm. The width B of the blank is preferably at least 50 mm, more preferably at least 100 mm, most preferably at least 300 mm.

The length of the blank L is preferably at least 500 mm, more preferably at least 1000 mm. Generally it is true that the method can be conducted in a more efficient manner, when the blank is longer. So also still longer blanks may be considered and may be advantageous. Also an execution of a method may be considered in which the blank is fed in a continuous manner or the blank is uncoiled from a roll. Furthermore, preferably the following is true: L>B.

The method according to the present invention may also be conducted with a blank which is coiled on a first roll. In this case the blank is also mounted in an upper region of the redrawing apparatus, but in such a manner that the blank can be uncoiled from the roll. The free end of the blank is then drawn from the roll by means of the drawing facility and/or the feeding facility. Then the blank is drawn through the deformation region in a preferably continuous and constant manner so that within the blank a deformation zone according to the present invention is formed. The glass component so prepared after passing the redrawing apparatus is preferably coiled onto a second roll. The blank may comprise or may not comprise a sheet edge (a thickened boundary region). By the provision of the blank on a roll and/or the coiling of the flat glass component onto a roll the method in total can be conducted more efficiently, since the blanks have not to be inserted singly into the apparatus in a laborious manner.

Finally, for example by cutting, the obtained glass component may be separated into single pieces. Furthermore, also the optionally somewhat thickened boundary regions (sheet edges) of the glass component may be cut off. If necessary, the glass component may also be polished and/or coated. With the method according to the present invention glass components with a very large usable surface area of glass can be obtained. This means that the part of the glass component with the required quality is very large. In the method of this invention the part of the surface area of sheet edges which optionally have to be removed before its use is small. Preferably, the glass components have a ratio of thickness to width of 1:2 to 1:20,000.

Preferably, the blank can be classified in a streak class of at most C. The streak class is a result of the optical path difference. For streak class C or better the optical path difference through a flat plate has to be <30 nm.

According to the present invention is also a glass component which is obtainable by the method according to the present invention. The glass component comprises at least one, in particular two fire-polished surfaces. Fire-polished surfaces are very smooth, i.e. their roughness is very low. In the case of fire-polishing in contrast to mechanical polishing a surface will not be abraded, but the material to be polished is heated to such a high temperature that it flows and thus becomes smooth. Therefore the costs for the production of a smooth surface by fire-polishing are substantially lower than for the production of a highly smooth mechanically polished surface. The blank may be polished or may not be polished. In the case of the use of a polished blank the glass component produced therefrom, without any further surface treatment such as grinding or polishing, also has a surface quality in particular with respect to surface roughness and/or smoothness which is sufficient for many uses.

With the method according to the present invention glass components with at least one fire-polished surface are obtained. Referred to the glass component according to the present invention, the term "surfaces" means the upper and/or lower sides, thus both faces which in comparison to the residual faces are the largest.

The fire-polished surface(s) of the glass components of this invention preferably have a root mean square roughness ($R_q$ or also RMS) of at most 5 nm, preferably at most 3 nm and particularly preferably at most 1 nm. The depth of roughness $R_t$ of the thin glasses is preferably at most 6 nm, further preferably at most 4 nm and particularly preferably at most 2 nm. The depth of roughness will be determined according to DIN EN ISO 4287.

In the case of mechanically polished surfaces the roughness values are worse. Furthermore, in the case of mechanically polished surfaces with the help of an atomic force microscope (AFM) polishing traces can be observed. In addition, also with the help of an AFM, residues of the mechanic polishing agent, such as diamond powder, iron oxide and/or $CeO_2$, can be observed. Since mechanically polished surfaces always have to be cleaned after a polishing step, leaching of certain ions at the surface of the glass occurs. This depletion of certain ions can be detected with the help of secondary ion mass spectrometry (ToF-SIMS). Such ions are for example Ca, Zn, Ba and alkali metals.

DESCRIPTION OF THE DRAWINGS

The figures and examples exemplify the features and advantages of the present invention. The invention is not limited to the shown embodiments.

FIGS. 5a and 5b show a cooling facility according to the present disclosure.

DETAILED DESCRIPTION

Figure 1:
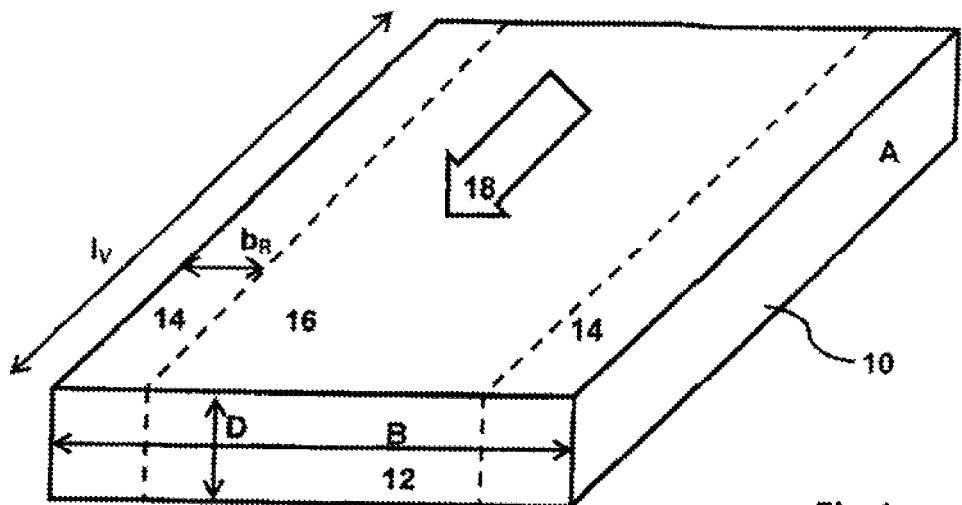
FIG. 1 shows a black according to the present disclosure.
Figure 2:
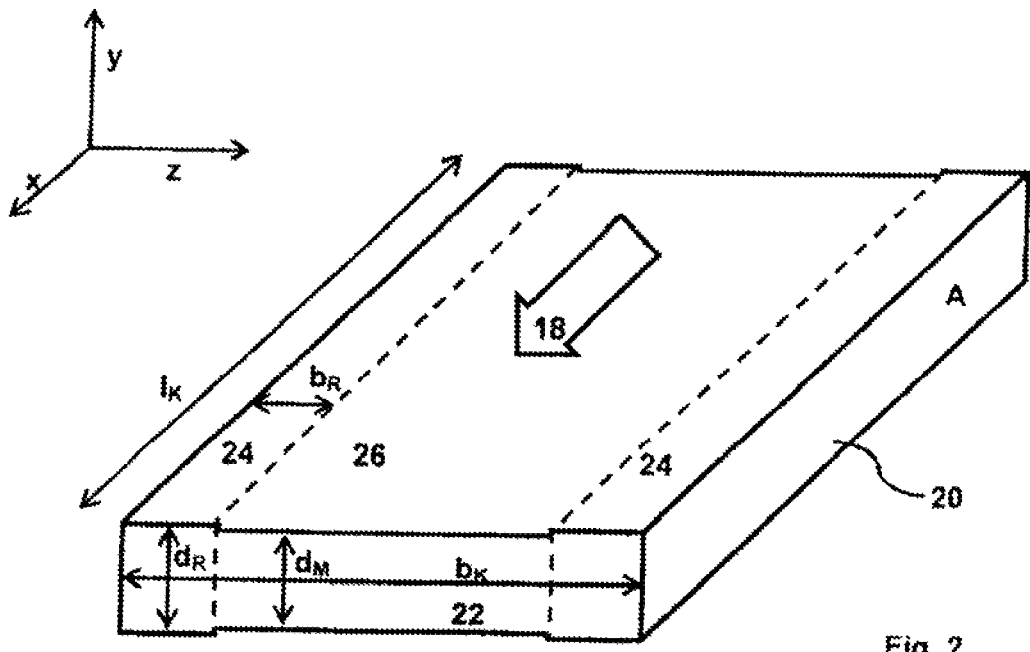
FIG. 2 shows another black according to the present disclosure.

In a schematic manner FIGS. 1 and 2 show a blank 10 respectively a glass component 20 having a cross-section area 12 respectively 22. Blank 10 is defined by length $l_v$ and width B. Similarly, glass component 20 is defined by length $l_K$ in the drawing direction 18 and width $b_K$ perpendicular to the drawing direction 18. The width of the edge regions 14 respectively 24 is defined as $b_R$. In the case of the thickness of the glass component 20 it is distinguished between the edge regions 24 with an edge thickness and/or sheet edge thickness $d_R$ and a center thickness $d_M$ of the center region 26. Due to the temperature in the edge region which is lower during the method according to the present invention and the higher viscosity which is a result thereof normally the following is true: $d_R/d_M>1$.

Glass component 20 is preferably featured in that in the center region 26 one or both surfaces have a smoothness of lower than 500 μm, preferably lower than 100 μm and particularly preferably lower than 10 μm, wherein smoothness according to DIN ISO 1101 means the distance between two parallel planes including the surface in the center region 26. Furthermore, the surface roughness Ra in the center region of the component is preferably at most 20 nm. Preferably, the glass component has a thickness of at most 5 mm. However, with the method according to the present invention also substantially thinner components with for example a thickness of 1 to 2 mm or also a thickness of at most 1.0 mm, preferably at most 0.5 mm, more preferable at most 0.1 mm, such as for example 0.05 mm or even 0.01 mm can be prepared.

Figure 3:
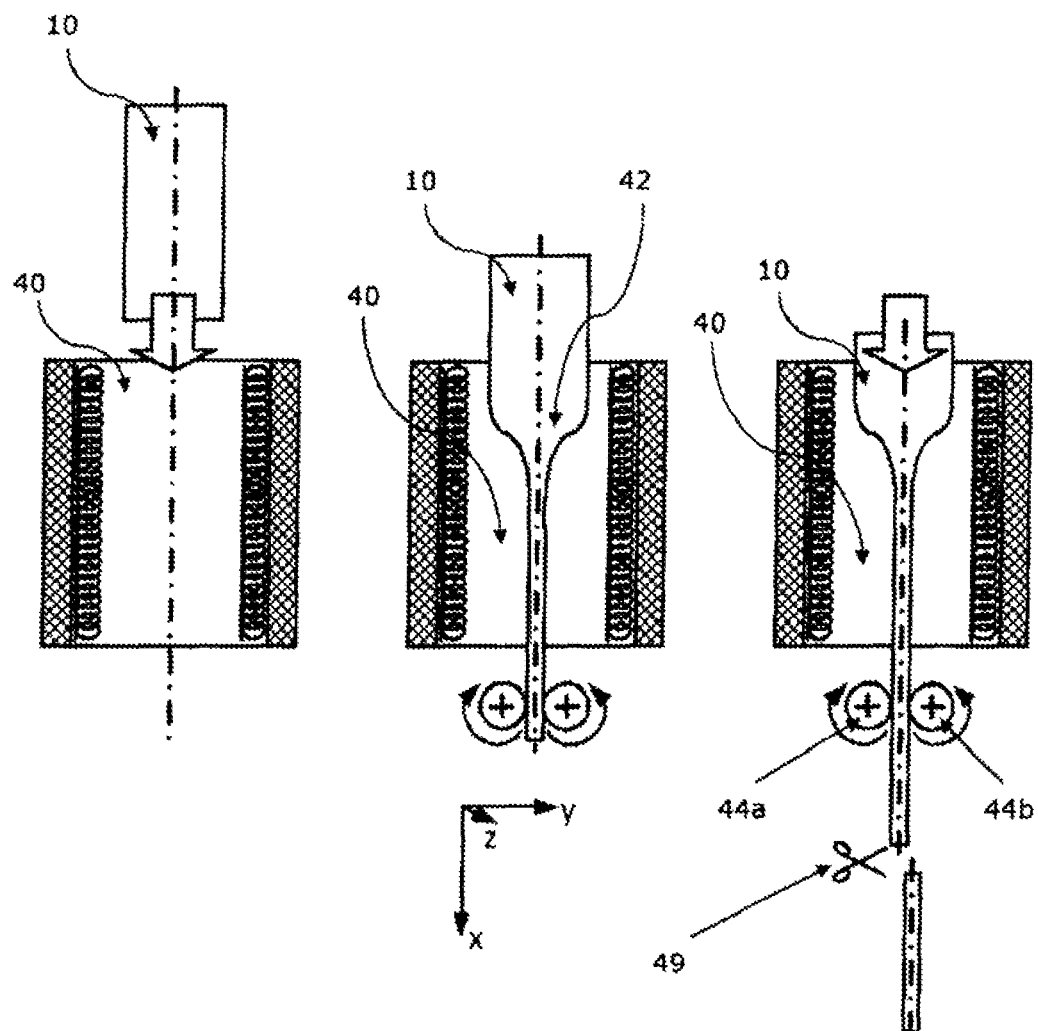
FIG. 3 shows in a schematic manner an apparatus for redrawing of flat glass components according to the present disclosure.

FIG. 3 shows in a schematic manner an apparatus for redrawing of flat glass components in the direction of view towards the small side of the glass ribbon (in the figures area A). A blank 10 is inserted into a deformation region 40. The blank is heated in region 42a and is drawn to a component with a lower thickness. The blank is fixed at its upper end in a mounting facility (not shown) and by means of rollers and/or rolls 44a and 44b a drawing force can be applied on the lower end of the glass ribbon. The drawn component can be separated into sections with suitable lengths by means of a cutting device and/or separation facility 49. In an alternative embodiment the drawn glass ribbon can be coiled onto a roll. Cooling facilities are not shown in this figure.

Figure 4A:
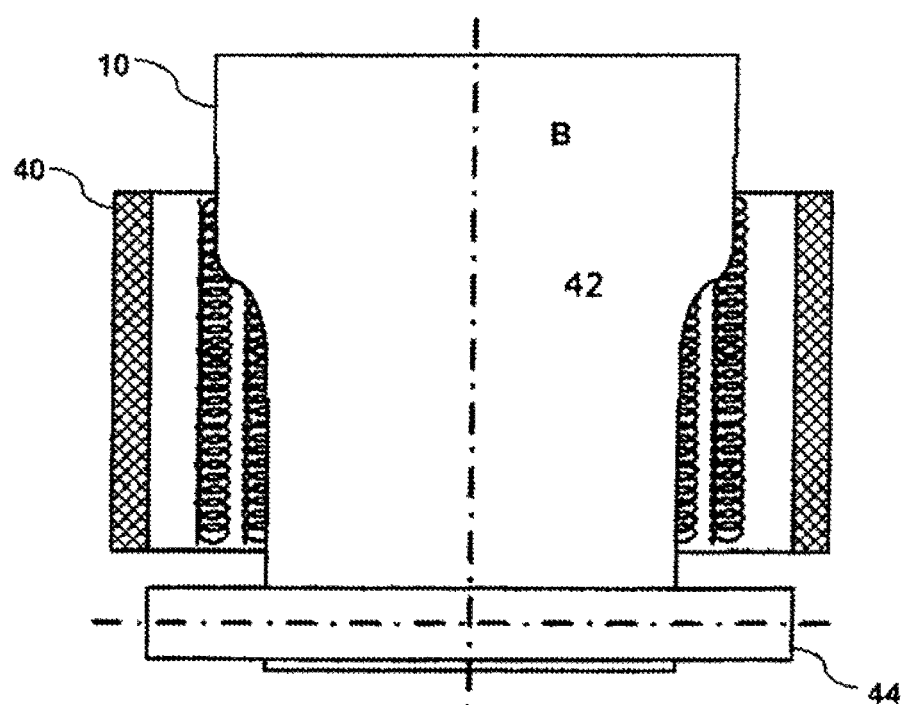
FIGS. 4a and 4b show the apparatus of FIG. 3, but here in the direction of view towards plane B of the blank.
Figure 4B:
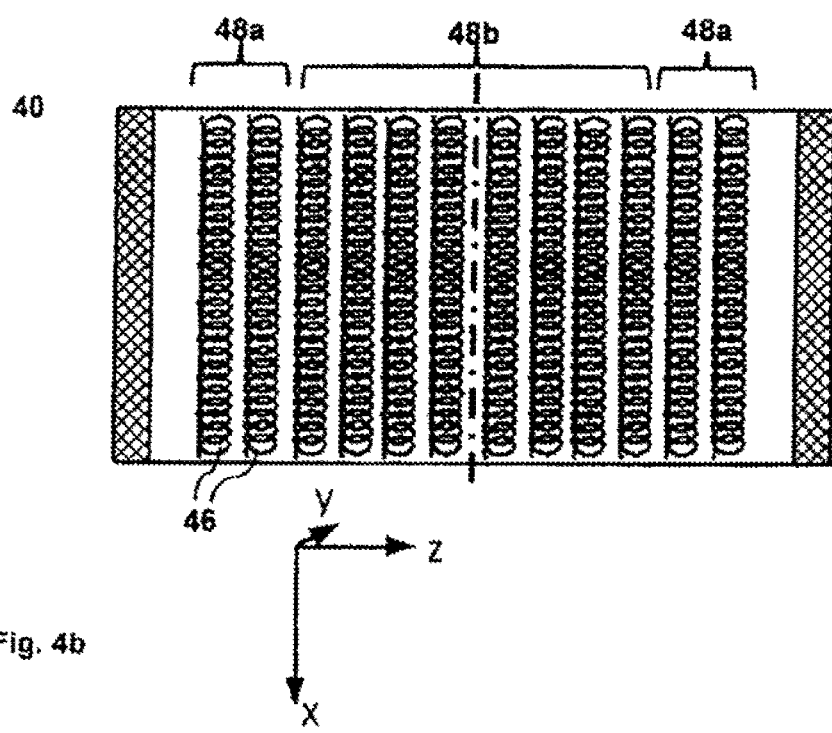

FIGS. 4a and 4b show the same apparatus for redrawing of glass components as in FIG. 3, but here in the direction of view towards plane B of the blank. Preferably, during the drawing operation the blank is continually fed into the deformation region. In this case the blank may for example be fixed at its upper end by rollers or rolls. The speed of feeding of the blank into the deformation region is preferably adjusted to the conditions in such a manner that in the direction of the thickness a uniform heat penetration of the center region and/or the edge regions of the blank is achieved. Uniform in this case means that the difference between the core and the surface temperatures in the center axis of the blank is smaller than 20 K. For guaranteeing sufficient viscosity for drawing the glass and for preventing breakage of the glass in the case of a viscosity which is too high and deformation which is too strong in the case of a viscosity which is too low during the drawing step, in the deformation region the center region of the blank is heated to a temperature $T_1$. The temperature of the edge regions is adjusted to temperature $T_2$. The deformation region can be heated by one or more sources of heat, such as preferably by electric heaters, flames, inductive sources of heat, short-wave infrared radiation (KIR), medium-wave infrared radiation (MIR), long-wave infrared radiation (UR) and/or laser beam.

According to the present invention the blank being inserted into the deformation region is adjusted to a lower temperature $T_2$ and thus to a higher viscosity $\eta_2$ in the edge regions and to a higher temperature $T_1$ and thus to a lower viscosity $\eta_1$ in the center region. To adjust such a temperature difference $\Delta T = T_1 - T_2$ in the deformation region here it is distinguished between the sources of heat 48a and 48b which heat the edge regions and the center region of the blank, respectively. Alternatively, the edge regions may also be cooled by means of one or more cooling facilities.

According to one embodiment of the invention heat is applied onto the blank in such a manner that automatically the desired temperature difference is reached in the deformation zone of the blank. For example, this is possible with a kiln as shown in FIGS. 4a and 4b. In FIG. 4b three different heating zones can be seen. The temperature may be adjusted such that the edge zones are cooler than the middle zone. Furthermore, the temperature difference between the heating regions 48a and 48b can be adjusted by intensified heating with sources of heat in heating region 48b. Preferably, the deformation region 40 in the regions 48a and 48b is equipped with separately controllable, such as for example electric sources of heat. Furthermore, optionally in addition the middle region may be heated with a laser beam, a flame and/or inductively. For example, in the middle region an optional further heat supply may be realized by means of a laser beam by guiding a laser beam with high frequency over the width of the blank in region 48b. Here it is obvious that basically heating by means of a laser beam from one side of the blank is sufficient. However also, heating by means of a laser from both sides may be conducted. The temperature difference between the heating regions 48a and 48b may also or in addition be adjusted by cooling with cooling facilities in the heating regions 48a.

A preferable cooling facility is for example a cooling finger 50 as shown in FIGS. 5a and 5b. The cooling finger 50 reduces the temperature in the edge regions of the blank by shadowing the source of heat and/or active cooling. In addition, the cooling fingers may actively be cooled by a fluid such as for example air, an aerosol or a liquid so that the cooling fingers have a controlled temperature during the time of the drawing process to exactly adjust the blank temperature in the edge regions. Such a fluid may be fed into the cooling finger with ambient temperature, cooled or heated.

As shown in FIGS. 5a and 5b, for such a cooling finger 50 an one-sidedly opened tube 51 may be provided in which via the opening a second two-sidedly opened tube 52 with lower cross-section, in particular coaxial, is arranged such that a first opening of the second tube is located inside the first tube. Via the second opening of the second tube a fluid can flow with a defined flow into the second tube, out of the first opening thereof, then into the first tube and via its opening out of the first tube. In addition, also baffles 53 can be used as further elements of the cooling facility which are located in the region between the edge region of the blank and the source of heat. So in a suitable manner the temperature distribution in the glass cannot only be adjusted in circumferential direction (angle segment), but at the same time also in axial direction for example of a muffle as a source of heat. According to a preferable embodiment such a cooling facility does not contact the glass ribbon at any site. This in particular prevents the occurrence of disturbing impurities and tensions as well as defects with respect to the smoothness and/or surface roughness in the glass component created. Tensions may result in breakage of the glass ribbon during cooling. Preferably, the cooling facilities are positioned in a distance from the surface of the blank of 0 to 50 cm, preferably 0.1 to 10 cm and particularly preferably 0.1 to 5 cm. With the cooling and/or heating facilities a temperature profile is created, wherein the temperature difference between edge regions and center region of the glass ribbon is preferably >0 to 100° C., preferably 10 to 60° C.

In FIGS. 5a and 5b also the center M of the blank can be seen. The width of the blank decreases in a top down manner. Also the horizontal distance of center M to cooling facility 50 decreases in FIG. 5a with decreasing width (B→b) of the blank. Numerous other possibilities are conceivable for achieving the temperature distribution in the deformation zone according to the present invention. Besides the possibility shown in FIG. 5a, wherein a cooling facility is provided with baffles 53 of increasing width, also a cooling facility may be designed as in FIG. 5b and may for example be aligned into the direction of the center of the blank.

EXAMPLES

The following table shows the results of the measures of this invention with respect to the ratio of width to thickness of the glass components prepared.

| | | Prior art, without edge cooler* | Prior art, with edge cooler* | According to the present invention | According to the present invention, with low deformation zone** |
|---|---|---|---|---|---|
| Width of blank B | mm | 508.0 | 508.0 | 120.0 | 120.0 |
| Thickness of blank D | mm | 6.4 | 6.4 | 14.0 | 14.0 |
| Ratio B/D | | 80.0 | 80.0 | 8.6 | 8.6 |
| Width of product b | mm | 19.1 | 61.4 | 45.0 | 100.0 |
| Thickness of product d | mm | 0.1 | 0.1 | 0.3 | 0.3 |
| Ratio b/d | | 250.0 | 853.3 | 150.0 | 333.3 |
| Ratio (b/d)/(B/D) | | 3.1 | 10.7 | 17.5 | 38.9 |

*method according to U.S. Pat. No. 3,635,687
**in addition to the temperature distribution according to the present invention a very low heating zone (30 mm) has been chosen.

It can be seen that the cooling of the edge regions may result in an increase of the ratio of width to thickness by a factor of 10.7. When the temperature distribution according to the present invention is applied in at least 75% of the deformation zone, then this may result in an additional increase of this ratio of nearly 70%. The combined use of a low deformation zone in addition results in an increase of higher than 100%. So flat glass components in substantially more efficient methods can be prepared.

LIST OF REFERENCE SIGNS

10 blank
12 cross-section area
14 edge region
16 center region
18 drawing direction
20 glass component
22 cross-section area
24 edge regions
26 center region
40 deformation region
42 deformation zone
44a, b mounting facility
46 heating facility
48a, b heating regions
49 separation facility
50 cooling finger
51 tube
52 second tube
53 baffles

What is claimed is:

1. A method for redrawing of glass, comprising the steps of:
providing a blank of a glass having an average thickness (D) and an average width (B), heating the blank; and
drawing the blank to an average thickness (d) and an average width (b), the blank comprising a center region and two edge regions,
wherein the drawing step further comprises adjusting a temperature of the blank in a portion of a deformation zone, wherein the adjusting step further comprises selectively cooling the two edge regions such that the center region reaches a first temperature (T1) that is higher than a second temperature (T2) of the two edge regions,
wherein the two edge regions are cooled by at least one cooling facility,
wherein the at least one cooling facility has a distance from a center of the blank that decreases with a decreasing width of the blank, and
wherein the deformation zone is a part of the blank that has a thickness of 1.05*d to 0.95*D, wherein the portion extends over a height of at least 75% of the deformation zone.

2. The method according to claim 1, wherein the portion extends over the whole height of deformation zone.

3. The method according to claim 1, wherein the adjusting step further comprises selectively heating the center region to achieve the first and second temperatures.

4. The method according to claim 1, wherein the at least one cooling facility comprises one or more baffles arranged between the blank and a source of heat.

5. The method according to claim 1, wherein the at least one cooling facility guides a fluid through the at least one cooling facility.

6. The method according to claim 1, wherein the two edge regions each have a width that is at least 1% and at most 25% of the average width (B) of the blank.

7. A method for redrawing of glass, comprising the steps of:
providing a blank of a glass having an average thickness (D), an average width (B), and a center (M);
heating the blank; and
drawing the blank to an average thickness (d) and an average width (b), the blank comprising a center region and two edge regions, the drawing step further comprising adjusting a temperature of the blank in a portion of a deformation zone such that the center region reaches a first temperature (T1) that is higher than a second temperature (T2) of the two edge regions, the deformation zone being a part of the blank that has a thickness of 1.05*d to 0.95*D,
wherein the step of adjusting the temperature comprises feeding a fluid to cool a cooling finger along each of the two edge regions and shadowing a source of heat with a baffle extending from the cooling finger between each of the two edge regions and a source of heat, the baffle having an increasing width such that a horizontal distance from the center (M) of the blank to the baffle decreases with decreasing width (B→b) of the blank.

8. The method according to claim 7, wherein the portion extends over a height of at least 75% of the deformation zone.

9. The method according to claim 7, wherein the portion extends over the whole height of deformation zone.

10. The method according to claim 7, wherein the two edge regions each have a width that is at least 1% and at most 25% of the average width (B) of the blank.

11. A method for redrawing of glass, comprising the steps of:
- providing a blank of a glass having an average thickness (D) and an average width (B), the blank having two edge regions with an edge thickness ($d_R$) and a center region with a center thickness ($d_M$), the edge thickness being higher than the center thickness;
- heating the blank; and
- drawing the blank to an average thickness (d) and an average width (b), the drawing step further comprising adjusting a temperature of the blank in a portion of a deformation zone such that the center region reaches a first temperature (T1) that is higher than a second temperature (T2) of the two edge regions, the deformation zone being a part of the blank that has a thickness of 1.05*d to 0.95*D, wherein the step of adjusting the temperature comprises feeding a fluid to cool a cooling finger along each of the two edge regions and shadowing a source of heat with a baffle extending from the cooling finger between each of the two edge regions and a source of heat, and wherein the baffle has an increasing width so that a horizontal distance from the center (M) of the blank to the baffle decreases with decreasing width (B→b) of the blank.

12. The method according to claim 11, wherein the portion extends over a height of at least 75% of the deformation zone.

13. The method according to claim 11, wherein the portion extends over the whole height of deformation zone.

14. The method according to claim 11, wherein the two edge regions each have a width that is at least 1% and at most 25% of the average width (B) of the blank.

* * * * *